United States Patent [19]

Ikeda

[11] Patent Number: 5,504,908
[45] Date of Patent: Apr. 2, 1996

[54] POWER SAVING CONTROL SYSTEM FOR COMPUTER SYSTEM

[75] Inventor: Osamu Ikeda, Tokyo, Japan

[73] Assignee: Dia Semicon Systems Incorporated, Tokyo, Japan

[21] Appl. No.: 39,869

[22] Filed: Mar. 30, 1993

[30] Foreign Application Priority Data

Apr. 2, 1992 [JP] Japan .................................. 4-080807

[51] Int. Cl.⁶ ........................................ G06F 1/32
[52] U.S. Cl. .................... 395/750; 365/227; 364/707
[58] Field of Search ........................ 395/750, 550, 395/575; 364/707; 365/226, 227

[56] References Cited

U.S. PATENT DOCUMENTS

| | | | |
|---|---|---|---|
| 4,718,043 | 1/1988 | Akatsuka | 365/227 |
| 4,980,836 | 12/1990 | Carter et al. | 364/483 |
| 5,142,684 | 8/1992 | Perry et al. | 395/750 |
| 5,148,546 | 9/1992 | Blodgett | 395/750 |
| 5,168,151 | 12/1992 | Nara | 235/492 |
| 5,222,239 | 6/1993 | Rosch | 395/750 |
| 5,369,771 | 11/1994 | Gettel | 395/750 |
| 5,388,265 | 2/1995 | Volk | 395/750 |
| 5,390,334 | 2/1994 | Harrison | 395/750 |
| 5,394,558 | 2/1995 | Arakawa et al. | 395/800 |
| 5,404,543 | 4/1995 | Faucher et al. | 395/750 |
| 5,426,755 | 6/1995 | Yokouchi et al. | 395/425 |
| 5,430,881 | 7/1995 | Ikeda | 395/750 |

*Primary Examiner*—Glenn A. Auve
*Attorney, Agent, or Firm*—Barnes & Thornburg

[57] ABSTRACT

A power saving control system for a computer system including a CPU, is provided with a mode selecting circuit for selectively operating the CPU in a first mode with relatively high performance and high power consumption and a second mode with relatively low performance and low power consumption, a repeated access detecting circuit for monitoring addresses accessed by the CPU over a given period in order to detect a predetermined operational state of the CPU, in which only specific address group is repeatedly accessed, a control circuit associated with the first means for normally operating the first means in the first mode and responsive to the second means detecting the predetermined operational state, for operating the first means in the second mode as long as the predetermined operational state is maintained, and a state display for generating an indication perceptible by an operator of the computer system indicating current operational mode of the CPU.

15 Claims, 2 Drawing Sheets

POWER SAVING CONTROL SYSTEM FOR COMPUTER SYSTEM

BACKGROUND OF THE INVENTION

1. Field of the Invention

The present invention relates to a power saving control system for a computer system. More specifically, the invention relates to a power saving control system particularly applicable for a battery-operated portable personal computer.

2. Description of the Related Art

As disclosed in Japanese Unexamined Patent Publication (Kokai) No. 2-178818, for example, power saving control is well-known in the art to interrupt power supply to those sections of a computer system which are not executing any substantial task for reducing total power consumption of the computer system. Such technology has already been applied to field products. In the field of battery-operated personal computers including a lap-top computer, much study has been given in the power saving technology of this type in the sake of maximizing the system uptime with a smaller and lighter battery.

Conventionally, two types of functions for placing the personal computer into a stand-by state, i.e. so-called a rest mode function and a sleep mode function are provided in certain types of personal computer systems. The rest mode function is performed for automatically switching an operational clock frequency of the computer system from 16 Mhz in the normal operational mode to 1 Mhz when a CPU is held inoperative state for a predetermined period of time. If a further predetermined period is elapsed while the computer system is held in the rest mode state, the sleep mode is automatically initiated to shut down the power supply. In either mode of operation of the computer system, the normal mode operation can be resumed by operating an arbitrary key. In many cases, the predetermined period of time for initiating the stand-by mode can be arbitrary set by the user through manual setting operation.

As can be appreciated, conventionally, the computer system is situated into the power saving state (i.e. the above-mentioned stand-by mode) in terms that "the CPU is held substantially inoperative state for a predetermined period of time". In practice, the operational state of the computer system is changed over from the normal state into the power saving state in absence of any external factor for initiating substantial task of the CPU, such as input through entry from a keyboard or from a communication supervisory system or so forth, for the predetermined period of time.

In general, the CPU is regarded as being in a substantial rest state when the above-mentioned factor to cause substantial task is absent for the predetermined period of time. With the conventional technology, in which the foregoing substantial rest state of the CPU is detected to change over the operational mode into the power saving mode, however, such procedure may not achieve sufficient power saving because it requires to set the predetermined period of time more than several tens seconds for typical personal computer.

For instance, it is assumed that a word processing application is active in the personal computer. In this case, every entry through the keyboard serves as the factor for causing initiation of the task in the CPU. In response to each input signal, the CPU performs various tasks including very simple tasks, such as displaying a character on a display screen, slightly time-consuming tasks, such as conversion of Kana entry into Kanji character or moving of a document and time-consuming tasks, such as sorting of files or so forth. When an operator is drafting a document, he tends to have relatively long intervals between key entries for considering word, phrase or so forth. In such case, the possible interval between key entries over several tens msec. to several sec. is frequently occurs.

In this circumstance, if the predetermined period of time in the conventional power saving method is set in a range of 1 sec. to several sec., the power saving mode operation can be initiated during time-consuming tasks to cause failure of the on-going task. For avoiding such possibility, it becomes necessary to set the predetermined period in a range of several tens sec. or several min. In such case, since power saving function is held inoperative during frequently occurring short intervals of key entry, in which the CPU is held substantially resting, satisfactory power saving effect cannot be achieved.

As a solution for this, it is possible to make the CPU per se to declare to an external circuit (power saving circuit) that it falls into substantial rest state at every occurrence of falling into substantial rest state. However, in such case, the function has to be included every software to be executed by the CPU. It is too difficult or even impossible to install such function for respective software which have already been completed.

On the other hand, if the computer system is active on a single software, it is possible to precisely detect the substantial rest state of the CPU by preliminarily analyzing the content of the software and detecting the state, in which a small loop is repeated with accessing only specific address group. However, this approach should not be practical when the computer system is active in a plurality of software.

SUMMARY OF THE INVENTION

Therefore, it is a primary object of the present invention to provide a power saving system for a computer, which can achieve saving of substantial power without requiring modification of any software active in the computer system.

Another object of the present invention is to provide a power saving system, which makes switching between a normal mode and power saving mode perceptible for a user of the computer system.

According to one aspect of the invention, a power saving control system for a computer system including a CPU, comprises:

first means for selectively operating the CPU in a first mode with relatively higher performance and higher power consumption and a second mode with relatively lower performance and lower power consumption;

second means for monitoring addresses accessed by the CPU over a given period in order to detect a predetermined operational state of the CPU, in which only specific addresses are repeatedly accessed during said given period;

third means operating according to a control signal from the first means for normally operating the first means in the first mode and responsive to the second means detecting the predetermined operational state, for operating the first means in the second mode as long as the predetermined operational state is maintained; and fourth means for generating an indication perceptible by an operator of the computer system indicating current operational-mode of the CPU.

In the preferred construction, the second means monitors addresses accessed by the CPU during said given period while a predetermined short period of time is periodically added to the given period. Practically, the second means may be operable in a learning mode in a given learning period which forms a first part of the given period, for recording addresses accessed by the CPU and a comparison mode in a given comparison period which forms a second part of the given period, for comparing a currently accessed address with the addresses recorded during the preceding given learning period. In this case, the second means may update the given learning period at the end of operation in the comparison mode and derive the given comparison period in relation to the updated learning period. Preferably, the second means varies the given learning period within a range defined by upper and lower limit values. Exemplarily, the second means initially sets the given learning period at the lower limit value and updates the learning period by adding a predetermined additional period unit to the instantaneous learning period at every end of operation in the comparison mode operation.

Also, in the practical construction, the third means is responsive to the second means detecting the state of the CPU out of the predetermined operational state while the CPU is in the second mode, to switch operation of the first means from the second mode to the first mode. Also, the fourth means comprises a visual indicator to be switched ON and OFF depending upon the instantaneous operational mode of the CPU selected by the first means.

In the preferred embodiment, the first means includes a first clock generator for generating a first higher frequency clock, a second clock generator for generating a second lower frequency clock, and a switching means for selectively supplying one of the first and second clock to the CPU.

According to another aspect of the invention, a power saving control system for a computer system including a CPU, comprises:

an operational mode switching means for switching operational mode of the CPU between a normal mode, in which power consumption is relatively larger than that in a power saving mode, and a power saving mode, in which the power consumption is relatively smaller than that in the normal mode;

a repeated access detecting means for monitoring address groups accessed by the CPU within a predetermined period at predetermined address resolution and for detecting a repeated access state of the CPU, in which a specific address group is repeatedly accessed;

a control means responsive to the repeated access detecting means detecting the repeated access state while the CPU is in the normal mode for switching the operational mode of the CPU to the power saving mode; and a state display means for displaying the operational mode of the CPU.

Preferably, the repeated access detecting means periodically varies the address resolution in monitoring address access transition.

It is further desirable that the power saving control system further comprises an inhibiting means for inhibiting operation of the control means for switching the operational mode from the normal-mode to the power saving mode when the operational state of the CPU satisfies a predetermined inhibiting condition.

Practically, the inhibiting means may inhibits switching operation of the control means when the address of the software interruption vector for receiving keyboard entry is accessed within an immediately preceding predetermined period, when an address of the software interruption for checking the keyboard entry is not accessed for over a preceding given period, or when an address assigned as a video memory space is being accessed.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention but are for explanation and understanding only.

DESCRIPTION OF THE PREFERRED EMBODIMENT

Figure 1:
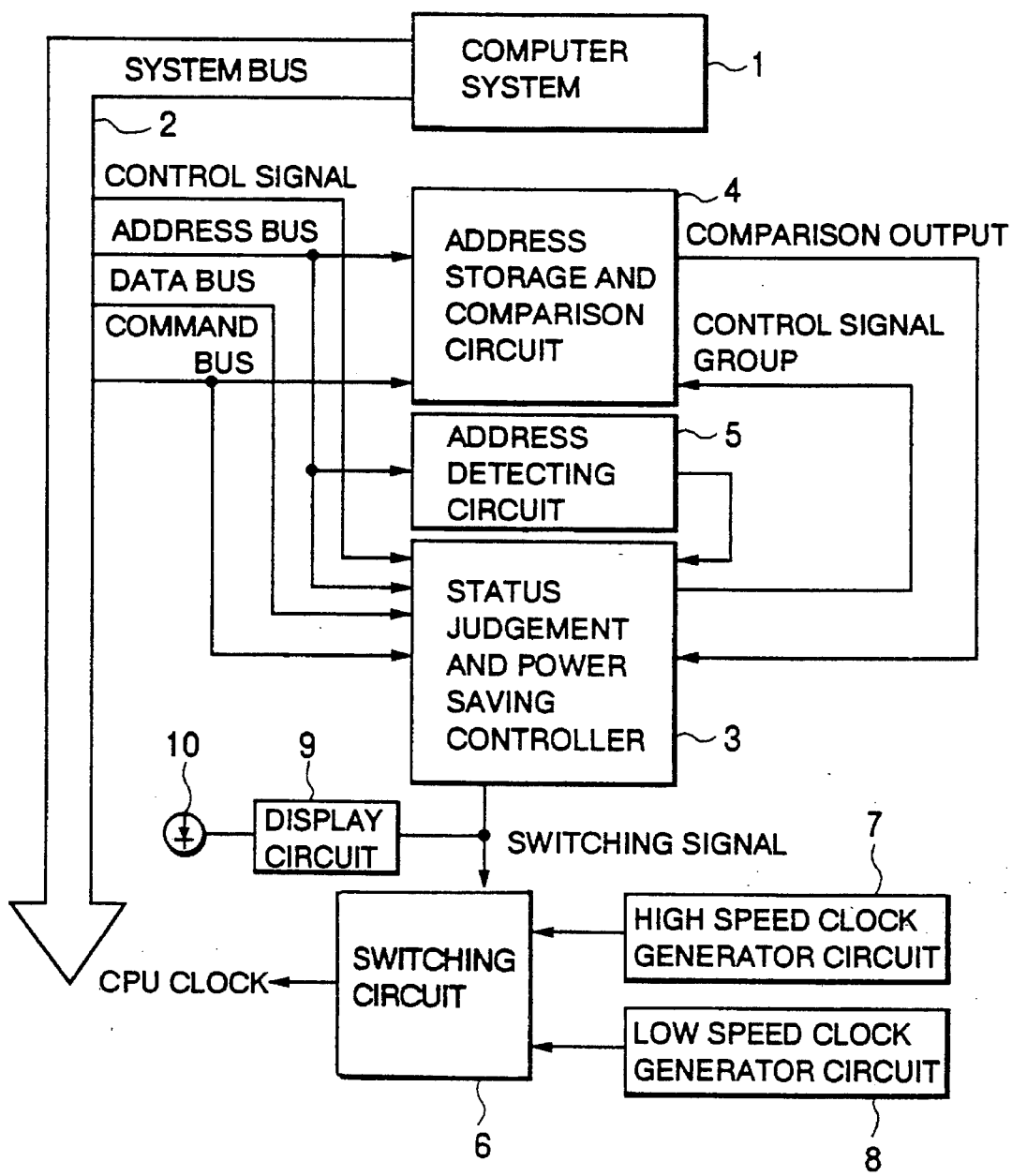
FIG. 1 is a schematic block diagram of the preferred embodiment of a power saving control system for a computer system according to the present invention.

Referring now to the drawings, particularly to FIG. 1, the preferred and exemplary embodiment of a power saving control system for a computer system is illustrated schematically. It should be noted that the general concept of power saving control and the general construction of a power saving control system relevant to the present invention has been disclosed in the commonly owned co-pending U.S. patent application Ser. No. 07/886,649, filed on May 20, 1992, which is, in turn, a Continuation-in-Part Application of U.S. patent application Ser. No. 07/735,382, filed on Jul. 24, 1991, and counterpart European Patent Application is also pending under Application No. 92906159.6, filed on Feb. 27, 1992. The disclosures of the above-identified related applications are herein incorporated by reference.

For the purpose of disclosure, the shown embodiment of the power saving control system is adapted for application to a so-called notebook-type personal computer, installed therein Intel 80386SX CPU. However, it should be appreciated that the above-identified specific computer system is not intended to be specific for the present invention but can be of any types of computer systems.

Power consumption in operation of the computer system is variable by varying a frequency of a CPU clock to be applied to the CPU. In the shown embodiment, the CPU is operated in a normal mode (high speed mode) in which power consumption is relatively high, and a power saving mode (low speed mode) in which power consumption is relatively low, by switching the CPU clock frequency. For providing different frequency of CPU clocks, the shown embodiment of the power saving control system includes a high speed clock generator circuit 7 which generates a high speed clock of a predetermined higher frequency, e,g, 50 MHz, and a low speed clock generator circuit 8 which generates a low speed clock of a predetermined lower frequency, e.g. 4 MHz. A switching circuit 6 is provided for selectively supplying one of the high speed clock and the low speed clock to the CPU of a computer system 1.

The shown embodiment of the power saving control system also includes a status judgement and power saving controller 3, an address storage and comparison circuit 4 and an address detecting circuit 5, which are connected to a system bus 2 of the computer system 1. These circuit components are adapted to perform monitoring of operation of the computer system and power saving control. The address storage and comparison circuit 4 is associated with the status judgement and power saving controller 3 so that it is selectively operated in an address storage mode and an address comparison mode depending upon a control signal from the latter. In the address storage mode, the content of storage is initially cleared and, subsequently, addresses accessed by the CPU of the computer system are stored with an appropriate address resolution. Namely, when the CPU accesses a certain address, "1" is set in a corresponding memory cell in the address storage and comparison circuit 4. A group of addresses stored in the address storage mode will be hereinafter referred to as "learnt address". In the address comparison mode operation of the address storage and comparison circuit 4, the address currently accessed by the CPU is compared with the learnt addresses in order. If the currently accessed address is other than the learnt addresses, an unmatching signal is output to the status judgement and power saving controller 3.

Further discussion will be given hereinbelow in terms of an application of the shown embodiment of the power saving control system according to the invention for the computer system 1, on which MS-DOS is active as an operating system. It should be noted that although the specific example will be discussed hereinbelow, the shown embodiment of the power saving control system according to the present invention is applicable for any computer systems which are active with various operating systems. In the exemplary application, in any MS-DOS application programs active in a real mode on 80386SX CPU, an interruption vector table are assigned to specific address. For this interruption vector table, a software interruption function for obtaining input data in response to an entry through a keyboard and a software interruption function for checking if the entry through the keyboard is present or not, are provided. The address detecting circuit 5 in FIG. 1 is a circuit for individually detecting access of two software interruption vectors in the interruption vector table for generating an address detection signal. The address detection signal is utilized by the status judgement and power saving controller 3 in a manner set out below.

In addition, the switching signal for switching operation modes output from the status judgement and power saving controller 3 is also input to an indicator circuit 9. The indicator circuit 9 is responsive to the switching signal to maintain a LED indicator 10 OFF during the normal mode operation of the CPU and ON during the power saving mode operation of the CPU. The LED indicator 10 may be arranged on a housing of the computer system together with a power indicator lamp, a RAM drive access indicator lamp, a hard disk access indicator lamp or so forth.

Figure 2:
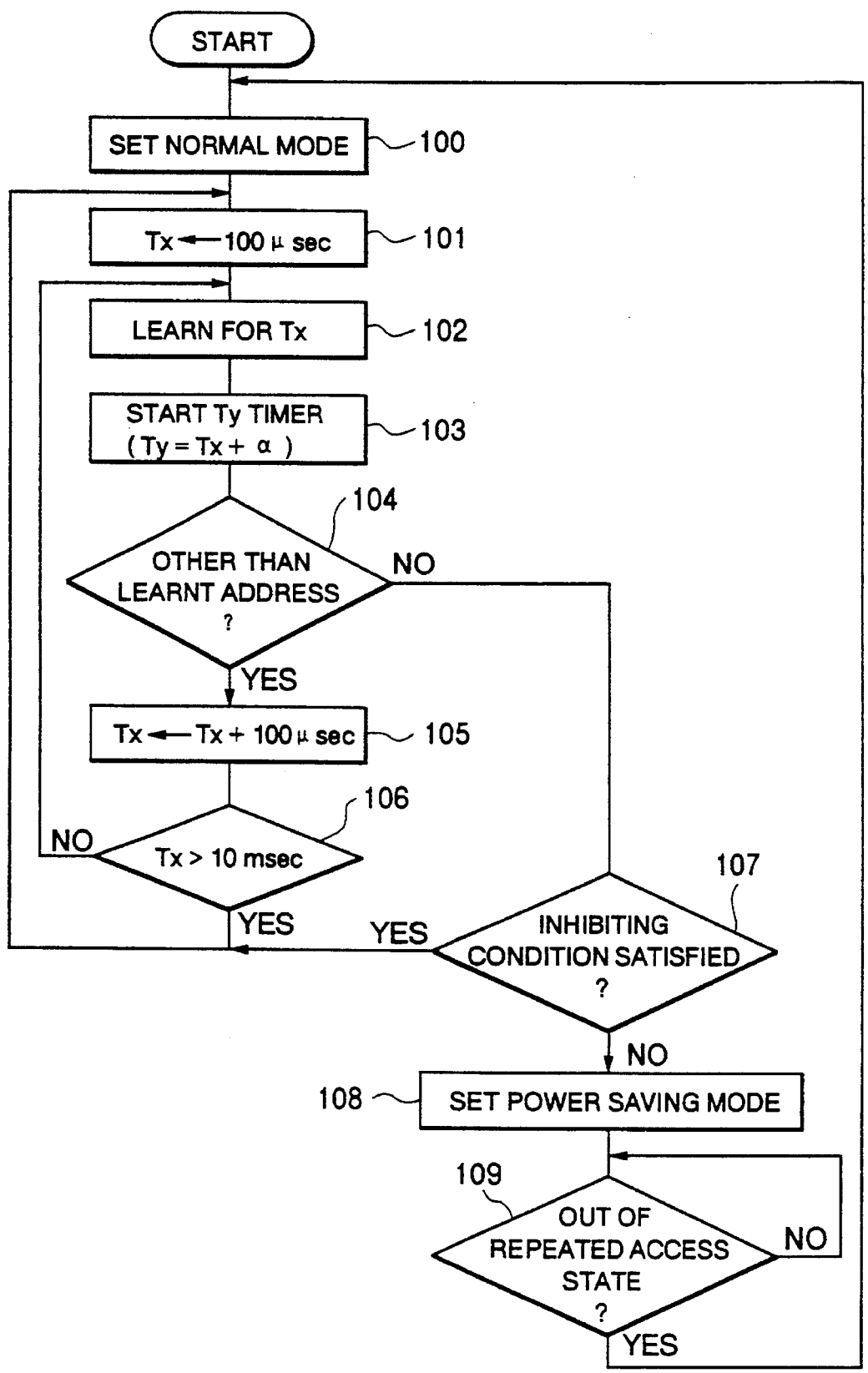
FIG. 2 is a flowchart showing a process of operation of a status judgement and power saving controller in the power saving control system of FIG. 1.

Processes of status monitoring and power saving control of the computer system 1 to be performed by the status judgement and power saving controller 3 is illustrated in a form of flowchart in FIG. 2. As shown in FIG. 2, at the initial step 100 the computer system 1 is set for the normal mode operation in which the high speed clock, e.g. 50 MHz clock, is supplied to the CPU for normal operation thereof. Then, at a step 101, a learning period Tx is set at a lower limit value, e.g. 100 μsec. Subsequently, at a step 102, the address storage and comparison circuit 4 is cleared or reset. Thereafter, at the step 102, the address storage mode operation of the address storage and comparison circuit 4 is initiated for the learning period Tx. By this, address blocks accessed by CPU during the learning period Tx is stored in the address storage and comparison circuit 4 to establish the learnt address.

At a step 103, a timer is started to measure a monitoring period Ty which is set depending upon the learning period Tx but longer than the learning period Tx. During the monitoring period Ty, the address storage and comparison circuit 4 operates in the comparison mode. The address storage and comparison circuit 4 acting in the comparison mode checks whether the CPU accesses an address other than those in the learnt addresses during the monitoring period Ty measured by the timer (steps 103 and 104). If the address other than the learned addresses is accessed within the monitoring period Ty, the process is advanced from the step 104 to a step 105. In the step 105, the learning period Tx is updated by adding 100 μsec. to the current value of the learning period Tx. Subsequently, at a step 106, check is performed if the Tx updated at the step 105 exceeds a predetermined upper limit value, e.g. 10 msec. If the updated Tx period is smaller than the upper limit value, e.g. 10 msec., the process is returned to the step 102 to re-start learning mode operation. On the other hand, if the updated Tx is greater than or equal to the upper limit value, the process is returned to the step 101 so that the learning period Tx is set at the lower limit value, e.g. 100 μsec.

Through the foregoing steps 100–106, the learning process at the step 102 and the monitoring process at the steps 103, 104, 105 are repeated with gradually increasing the learning period Tx and the monitoring period Ty from the lower limit value to the upper limit value, to detect a repeated access state, in which "no address other than the learnt addresses is accessed within the monitoring period Ty".

When the repeated access state, in which "no address other than the learnt addresses is accessed within the monitoring period Ty" is detected, the process is advanced from the step 104 to a step 107 to perform judgement whether the status of the computer system 1 is matched with the following inhibiting conditions. If the status of the computer system does not match with any of the inhibiting conditions, the process is advanced to a step 108. At the step 108, the switching circuit 6 is switched over so that the low speed clock, e.g. 4 MHz clock, from the low speed clock generator circuit 8 is supplied to the CPU to operate the latter in the power saving mode. Subsequently, at a step 109, check is continuously performed if the CPU moves out of the repeated access state or not. If the CPU status out of the repeated access state is detected, the process returns to the initial step 100 so that the high speed clock, e.g. 50 MHz clock, from the high speed clock generator 7 is supplied to the CPU to operate the latter in the normal mode.

It should be noted that the inhibiting conditions to be set in the step 107 may be, for example, (1) when the address of the software interruption vector for receiving keyboard entry is accessed within an immediately preceding predetermined period, (2) when an address of the software interruption for checking the keyboard entry is not accessed in over a given period in the past, and (3) when an address assigned as a video memory space is being accessed.

On the other hand, at the step 109, moving out of the repeated access state is practically detected in the following manner. By operating the address storage and comparison circuit 4 in the comparison mode, continuous check is performed as to whether the address other than the learnt addresses is accessed. When the address other than the learnt address is accessed, judgement is made that the CPU moves out of the repeated access state. Also, even when no address other than the learnt address is accessed, judgement is made that the repeated access state is terminated when the address of the software interruption vector for reading in the keyboard entry is accessed.

As set forth above, the operational state where the CPU repeatedly access a certain group of addresses within a given period less than or equal to approximately 20 msec., is detected so that the CPU is operated in the power saving mode during the period that the repeated access state is continuously detected except for the case where the abovementioned inhibiting conditions is established. By this, in the operating state of typical MS-DOS or its applications, the power saving period is frequently appear in a range of 10 msec. to several sec. to achieve substantial power saving without substantially lowering the processing performance of the computer system.

The power saving mode operation for substantially short period as set forth above, should not be perceptible to the operator in most case. In the shown embodiment, since the LED indicator 10 is turned ON while the CPU is in the power saving mode, the operator may appreciate the relationship between his own key operation, execution state of the software and the operation of the shown embodiment of the power saving control system. This may clear up the concern which might be arisen in the operator if the power saving control should not affect to the processing operation of the computer system and to the performance of the CPU.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

For instance, while the foregoing embodiment employs a control system, in which the clock frequency is differentiated between the normal mode and the power saving mode in order to reduce power consumption, various control systems, such as those lowering the power source voltage, intermittently operating the CPU at an appropriate interval or lowering the accessing rate of the CPU, can also be employed. These control systems may be selected depending upon application of the power saving control system.

Also, it is possible to control the operational mode of the CPU depending upon the temperature condition thereof for avoiding overheating. The temperature dependent control has been discussed in the co-pending U.S. Patent Application for "Drive Control System for Microprocessor", commonly owned by the owner of the present invention. The disclosure of the above-identified commonly owned copending U.S. Patent Application is herein incorporated by reference. In addition, it is also possible to selectively initiate the power save mode operation depending upon the periods, in which the repeated access mode is detected. Such procedure is effective for avoiding initiation of the power save mode in certain instance, such as execution of a loop for a software time. The process is disclosed in the co-pending U.S. Patent Application for "Power Saving Control System for Computer System with Feature of Selective Initiation of Power Saving Control" commonly owned by the owner of the present invention. The disclosure of the above-identified commonly owned co-pending U.S. Patent Application is also herein incorporated by reference.

What is claimed is:

1. A power saving control system for a computer system including a CPU, comprising:

first means for selectively operating said CPU in a first mode with relatively higher performance and higher power consumption and a second mode with relatively lower performance and lower power consumption;

second means for monitoring addresses accessed by said CPU over a given period in order to detect a predetermined operational state of said CPU, in which only specific addresses are repeatedly accessed during said given period;

third means operating according to a control signal from said first means for normally operating said CPU in said first mode and responsive to said second means detecting said predetermined operational state, for operating said CPU in said second mode as long as said predetermined operational state is maintained; and fourth means for generating an indication perceptible by an operator of said computer system indicating a current operational mode of said CPU.

2. A power saving control system as claimed in claim 1, wherein said second means monitors addresses accessed by said CPU during said given period while a predetermined short period of time is periodically added to said given period.

3. A power saving control system as claimed in claim 1, wherein said second means is operable in a learning mode in a given learning period which forms a first part of said given period, for recording addresses accessed by said CPU and a comparison mode in a given comparison period which forms a second part of said given period, for comparing a currently accessed address with addresses recorded during the preceding given learning period.

4. A power saving control system as claimed in claim 3, wherein said second means updates said given learning period at the end of operation in said comparison mode and derives said given comparison period in relation to the updated learning period.

5. A power saving control system as claimed in claim 4, wherein said second means varies said given learning period within a range defined by upper and lower limit values.

6. A power saving control system as claimed in claim 5, wherein said second means initially sets said given learning period at said lower limit value and updates said learning period by adding a predetermined additional period unit to an instantaneous learning period at every end of operation in said comparison mode.

7. A power saving control system as claimed in claim 1, wherein said third means is responsive to said second means detecting that the state of said CPU is out of said predetermined operational state while said CPU is in said 8. A power saving control system as claimed in claim 1, wherein said fourth means comprises a visual indicator to be switched ON and OFF depending upon an instantaneous operational mode of the CPU selected by said first means.

9. A power saving control system as claimed in claim 1, wherein said first means includes a first clock generator for generating a first higher frequency clock, a second clock generator for generating a second lower frequency clock, and a switching means for selectively supplying one of said first and second clock to said CPU.

10. A power saving control system for a computer system including a CPU, comprising:

an operational mode switching means for switching the operational mode of said CPU between a normal mode, in which power consumption is relatively larger than that in a power saving mode, and said power saving mode, in which the power consumption is relatively smaller than in said normal mode;

a repeated access detecting means for monitoring address groups addressed by said CPU within a predetermined period at predetermined address resolution and for detecting a repeated access state of said CPU, in which a specific address group is repeatedly accessed;

a control means responsive to said repeated access detecting means detecting said repeated access state while said CPU is in said normal mode for switching the operational mode of said CPU to said power saving mode; and a state display means for displaying the operational mode of said CPU.

11. A power saving control system as claimed in claim 10, wherein said repeated access detecting means periodically varies said address resolution in monitoring address access transition.

12. A power saving control system as claimed in claim 11, which further comprises an inhibiting means for inhibiting operation of said control means for switching the operational mode from said normal mode to said power saving mode when the operational state of said CPU satisfies a predetermined inhibiting condition.

13. A power saving control system as claimed in claim 12, wherein said inhibiting means inhibits switching operation of said control means when an address of a software interruption vector for receiving keyboard entry is accessed within an immediately preceding predetermined period.

14. A power saving control system as claimed in claim 12, wherein said inhibiting means inhibits switching operation of said control means when an address of a software interruption for checking a keyboard entry is not accessed for over a preceding given period.

15. A power saving control system as claimed in claim 12, wherein said inhibiting means inhibits switching operation of said control means when an address assigned as a video memory space is being accessed.

* * * * *